3,030,233
COATING COMPOSITIONS WITH GELATIN AGENTS THEREIN

Donald F. Koenecke, Westfield, N.J., and Walter L. Van Nostrand, Jr., Staten Island, N.Y., assignors to Esso Research and Engineering Company, a corporation of Delaware
No Drawing. Filed Dec. 31, 1958, Ser. No. 784,024
4 Claims. (Cl. 117—121)

This invention relates to a smooth, uniform film and more particularly to a method for providing an improved coating composition and a film therefrom.

It is known to apply a polydiolefin coating composition to a surface and to subsequently cure the coated surface in order to form a film therefrom. However, in the past, the polydiolefin oil, per se, or one which has been air blown, does not sufficiently wet the surface of a metal, e.g., tin plate. Consequently, eye-holing occurs; in other words, craters, holidays, and/or cracks are formed and the bare metal itself may even be exposed. This, therefore, is repugnant to the desired result, especially when protection of the metal and the aesthetic appearance of the end product are the paramount characteristics.

It has now been discovered that eyeholing can be eliminated by incorporating a gelation agent in the polymeric oil. Thus, in accordance with one embodiment of this invention, a polymer of a $C_4$ to $C_6$ conjugated diolefin is prepared. This polydiolefin, if desired, can then be chemically modified, by air blowing to incorporate oxygen in its structure. A gelation agent, e.g., a treated clay, is subsequently added to the polydiolefin oil itself or to the air blown oil. The admixture therefrom is applied to a surface; and the coated surface is then cured to provide a smooth, uniform film.

Polymeric drying oils included in this invention are prepared from diolefins, particularly those which are conjugated and have 4 to 6 carbon atoms per molecule, such as butadiene, hexadiene, isoprene, dimethyl butadiene, piperylene, and methyl pentadiene. Diolefins may be used which are copolymerized with minor amounts of ethylenically unsaturated monomers such as styrene, acrylonitrile, methyl vinyl ketone, or with styrenes having alkyl groups substituted on the ring, e.g., paramethyl styrene, dimethyl styrene, etc.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises measured at 50 wt. percent concentration in a hydrocarbon solvent. The preparation of this oil in the presence of an alkali metal or peroxide catalyst is described in U.S. Patents 2,762,851 and 2,586,594, which are incorporated herein by reference.

It is also within the purview of this invention to use the above polymeric oil which has been air blown to incorporate oxygen in its structure. This can be accomplished by blowing the oil with air or oxygen, preferably in the presence of a solvent, such as aromatic solvents or solvent mixtures having a Kauri Butanol value of at least 50. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts, if employed, are organic salts of metals such as cobalt, lead, iron, and manganese. The naphthenates, octoates, and oleates are especially suitable. These catalysts are used in amounts ranging from 0.001% to 1.0%. The nature of the oxidized diolefin polymer largely depends upon the type of original polymerization and the extent of oxidation which is dependent upon various factors as time, temperature, catalyst, and solvent. Preferred compounds are the oxidized copolymers of 75 to 85% butadiene and 25 to 15% styrene with about 10 to 20% oxygen in the structure.

It is also possible in this invention to incorporate oxygen in the structure of a polydiolefin oil by the addition of an anhydride of an unsaturated dicarboxylic acid, e.g., maleic anhydride, chloromaleic anhydride or citraconic anhydride. However, maleic anhydride is preferred. This modification can be accomplished by adding maleic anhydride to the reactants prior to the polymerization. However, the preferred method is to add maleic anhydride to the oil after polymerization and heat the mixture therefrom at a temperature of between 50° and 250° C., preferably 180 to 220° C. for about 15 minutes to 2 hours. In accordance with this invention, it is preferred for the polymeric oil to be modified with between 0.01 to 2.5%, preferably 0.05 to 0.5% of the unsaturated anhydride, e.g., maleic anhydride. This chemical modification of the curable drying oil, which can be also included in the polymer mix, is described in U.S. Patent 2,652,342 which is also incorporated herein by reference.

In accordance with this invention a gelation agent is mixed with the aforementioned polydiolefin oil per se or a chemically modified oil. A gelation agent in this invention is defined as an additive which promotes gelling, a viscosity increase, or thixotropy. An especially preferred gelation agent is a bentonite (a clay containing appreciable amounts of clay mineral montmorillonite and usually having the ability to swell greatly by absorption of water) composed principally of aluminum silicates usually with some magnesium and iron which has been treated to become organophyllic and less hydrophyllic. Montmorillonite has the general formula: $(Mg, Ca)O.Al_2O_3—5SiO_2.nH_2O$. A preferred treated bentonite is dimethyldioctadecyl ammonium bentonite. Other suitable commercial gelation agents for this invention include Raybo 6 and 94 and Hysil 233.

The above gelation agents may be added to the polydiolefin oil in amounts ranging from 1 to 10 parts, preferably 2 to 5 parts per 100 parts by weight of polymer. A preferred method to arrive at this final admixture is to first disperse a relatively high concentration of the gelation agent in the polymeric oil to provide a base comprising 5 to 15 parts of gelation agent per 100 parts of polymer. This base is subsequently mixed with additional polymer to form the final coating composition. Furthermore, relatively small amounts of polar organic compounds, e.g., 15 to 100 parts, based on the additive, of organic alcohols, e.g., methanol; esters, e.g., ethyl acetate; ketones, e.g., methyl ethyl ketone; or organic acids, e.g., formic acid, may be included in the admixture to accelerate the initial gel action.

A surface of a material, e.g., tin plate, can then be coated with this admixture of polymeric oil and gelation agent. The thickness of the coating may vary according to the desired result, but generally it will be within a range of 0.1 to 1.0 mils, preferably 0.2 to 0.5 mils. The admixture applied to the above surface is subsequently cured by the usual methods known in the art, e.g., baking and flame curing. A preferred method is by baking at a temperature between 390° and 410° F. for 10 to 12 minutes.

Thus, in accordance with this invention the appearances of the end product is improved. Craters, cracks, and/or eyeholes do not occur and the supported film is smooth and uniform. Therefore, it is now possible to use a polydiolefin oil more effectively for coating cans and comparable items where the aforementioned characteristics are all important.

The following examples are submitted to illustrate and not to limit this invention.

EXAMPLE I

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range 150° to 200° C.; solvent power, 33–37 Kauri-Butanol value (reference scale; benzene—100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poise at 50% NVM in Varsol solution and the nonvolatile portion thereof had an average molecular weight of about 8000.

A polymeric solution was then provided in a reactor comprising 35 wt. percent of the above copolymer in Solvesso (high percentage of aromatics with an API gravity of 30.2, a flash point of 118° C., and a boiling range of 322°–351° F.). The solution was blown with oxygen for 2 hrs and 15 min. at 240° F. in the presence of 0.01 wt. percent of manganese as the naphthenate soap as a catalyst to incorporate 10% oxygen in the structure of the copolymer. The solution with the oxidized polymer therein was stripped at a temperature of 220°–240° F. and a vacuum of 20 mm. Hg. to provide a product of 50 percent NVM.

Five parts of Bentone 34 (dimethyl dioctadecyl ammonium bentonite) were added to the 100 parts of the aforementioned oxidized polymer and dispersed on a three-roll paint mill to form a base. No polar solvent was simultaneously incorporated therein because the solution contained 12.5% isopropanol. After a uniform mixture was obtained, the base was incorporated into additional oxidized polymer to provide a final mixture containing 2 parts of Bentone 34 per 100 parts of oxidized polymer.

Film A, 0.36 mil in thickness, was formed by coating the surface of tin plate with this final mixture and by subsequently baking the coated surface at a temperature of 400° F. for 10 minutes. Film B was formed by a similar method except the oxidized polymer did not have the Bentone 34 included therein. The appearance of each of the cured films is as follows:

| Film: | Rating |
|---|---|
| A | 0 |
| B | 1 |

Rating System for All Examples

0—no eyeholes, excellent
1—occasional, scattered eyeholes, generally acceptable
2—frequent eyeholes
3—normal eyeholing on the butadiene styrene drying oil, many imperfections
4—worse than control 3.

EXAMPLE II

Five parts of Bentone 34 and 2.5 parts of methanol were added to 100 parts of the unoxidized polymeric oil (167 g. of 60% solution) of Example I. A base was formed in a similar manner as described in Example I. This base was incorporated into additional unoxidized polymer to provide a final mixture comprising 2 parts of Bentone 34 and 1 part of methanol per 100 parts of polymer.

This final mixture was applied to the surface of tin plate to form a coating thereon, 0.33 mil in thickness. Film C was provided by curing the coated surface at a temperature of 400° F. for 12 minutes. Film D was similarly prepared; however, the Bentone 34 was not included in the unoxidized polydiolefin oil. A comparison of the two films is shown below:

| Film: | Rating |
|---|---|
| C | 1 |
| D | 4 |

Examples I and II demonstrate that eyeholding is eliminated by curing an oxidized or unoxidized polydiolefin in the presence of a gelation agent.

EXAMPLE III

Various amounts of Bentone 34, and various amounts and types of accelerators were incorporated in 1% maleic treated polymeric oil of Example I. These admixtures were prepared and applied to tin plate with subsequent curing in a procedure similar to the one described for Example I. Films G, H, I, J, K, and L were thereby formed with the proportions of materials indicated in the table below. Films M, N, and O are controls and, therefore, Bentone 34 was not included in the polymeric oil. The appearance of each film is as follows:

| Film | Parts of Bentone per 100 parts of Polymer | Parts of Accelerator per 100 parts of Polymer | Rating for the Cured Film |
|---|---|---|---|
| G | 1.0 | 0.4 methanol | 1 |
| H | 2.0 | 0.8 methanol | 0 |
| I | 2.0 | 0.8 methanol and 12 isooctyl alcohol | 1 |
| J | 2.0 | none | 0 |
| K | 5.0 | 2.0 methanol | 0 |
| L | 5.0 | 2.0 methanol | 0 |
| M | none | none | 3 |
| N | none | none | 4 |
| O | none | none | 3 |

This example shows the substantial improvement which results by curing a maleic modified diolefin copolymer film in the presence of a gelation agent. The films M, N, and O, prepared in the absence of a gelation agent, have extreme craters and eyeholes. In contrast, films prepared in accordance with the present invention are smooth and uniform.

Having set forth the general nature and specific embodiments of the present invention, the true scope is now particularly pointed out in the appended claims.

What is claimed is:

1. A method which comprises providing a liquid polymer of a $C_4$ to $C_6$ conjugated diolefin prepared in the presence of a catalyst selected from the group consisting of an alkali metal and peroxide catalyst; modifying said liquid polymer chemically to incorporate oxygen in its structure; mixing 100 parts of said oxidized polymer with 1 to 10 parts of a bentonite treated to become organophyllic and less hydrophobic to form a coating composition; applying said coating composition to a base surface; and subsequently curing said applied coating to provide a smooth, uniform film without eyeholing therein.

2. The method according to claim 1 in which the treated bentonite is dimethyl dioctadecyl ammonium bentonite.

3. The method according to claim 1 in which the oxygen is incorporated by the addition of an anhydride of an unsaturated dicarboxylic acid.

4. The method according to claim 1 in which up to 20% oxygen is incorporated by air blowing.

References Cited in the file of this patent

UNITED STATES PATENTS

| | | |
|---|---|---|
| 2,531,396 | Carter et al. | Nov. 28, 1950 |
| 2,622,987 | Ratcliffe | Dec. 23, 1952 |
| 2,623,853 | Stross | Dec. 30, 1952 |
| 2,626,241 | Sparks et al. | Jan. 20, 1953 |
| 2,697,699 | Cohn | Dec. 21, 1954 |
| 2,768,908 | Cull | Oct. 30, 1956 |
| 2,856,300 | McKay | Oct. 14, 1958 |
| 2,856,309 | Gleason et al. | Oct. 14, 1958 |
| 2,879,229 | Stratton | Mar. 24, 1959 |
| 2,885,360 | Haden et al. | May 5, 1959 |
| 2,902,390 | Bell | Sept. 1, 1959 |

UNITED STATES PATENT OFFICE
CERTIFICATE OF CORRECTION

Patent No. 3,030,233                     April 17, 1962

Donald F. Koenecke et al.

It is hereby certified that error appears in the above numbered patent requiring correction and that the said Letters Patent should read as corrected below.

In the heading to the printed specification, line 2, in the title of invention, for "GELATIN read -- GELATION --.

Signed and sealed this 21st day of August 1962.

(SEAL)
Attest:

ESTON G. JOHNSON

Attesting Officer

DAVID L. LADD

Commissioner of Patents